E. B. GAGER, Jr.
REEL FOR STRIP MATERIAL.
APPLICATION FILED MAR. 11, 1921.
1,397,954.
Patented Nov. 22, 1921.
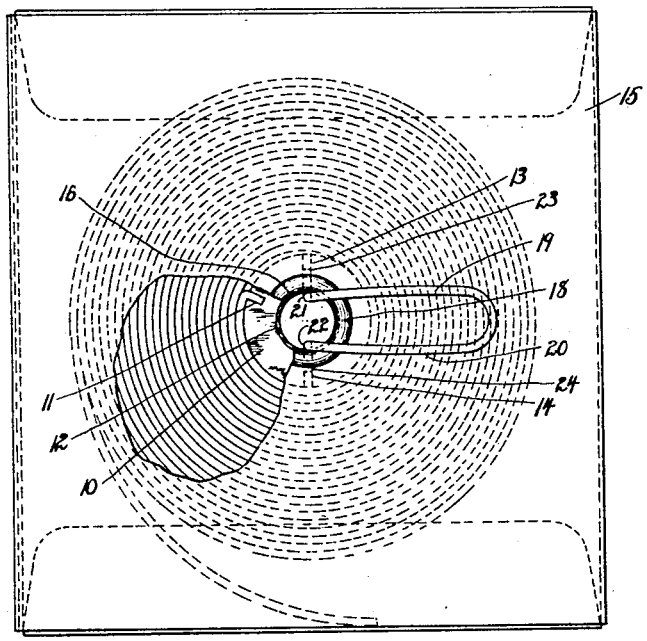
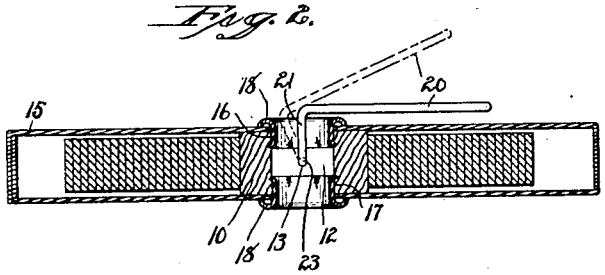
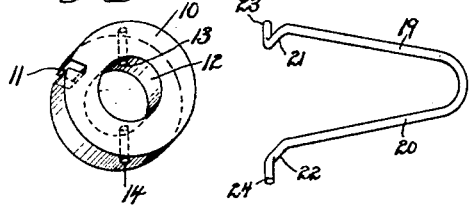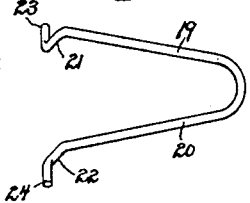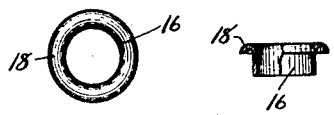

UNITED STATES PATENT OFFICE.

EDWIN B. GAGER, JR., OF DERBY, CONNECTICUT, ASSIGNOR TO THE DERBY TEXTILE CO., OF DERBY, CONNECTICUT, A CORPORATION.

REEL FOR STRIP MATERIAL.

1,397,954.  Specification of Letters Patent.  Patented Nov. 22, 1921.

Application filed March 11, 1921. Serial No. 451,456.

*To all whom it may concern:*

Be it known that I, EDWIN B. GAGER, Jr., a citizen of the United States, residing at Derby, in the county of New Haven and State of Connecticut, have invented a new and useful Improvement in Reels for Strip Material; and I do hereby declare the following, when taken in connection with the accompanying drawings and the characters of reference marked thereon, to be a full, clear, and exact description of the same, and which said drawings constitute part of this application, and represent, in—

Figure 1, a face view partly broken away of a reel for strip material constructed in accordance with my invention.

Fig. 2, a transverse sectional view of the same.

Fig. 3, a perspective view of the spool detached.

Fig. 4, a perspective view of the handle detached.

Fig. 5, a plan view of one of the spool-collars detached.

Fig. 6, a side view partly in section of the same.

This invention relates to improvement in reels for strip material and particularly to reels which include a spool mounted in a box in which it may be turned and on which the strip material is wound, the strip passing through a clearance-slot formed for it in one edge of the box.

The object of this invention is a simple arrangement of a handle, whereby the spool may be turned so as to wind the strip material thereon and the invention consists in the construction as hereinafter described and particularly recited in the claims.

In carrying out my invention I employ a spool 10, preferably formed from wood and preferably formed in its edge with a notch 11. This spool is formed with a central opening 12 and is drilled transversely to form sockets 13 and 14 in each side of the opening 12. This spool is mounted in the center of a paper-box 15 with which it is connected by metal collars 16 and 17 entering the box on opposite sides and projecting into the spool with which the inner ends of the collars engage, the outer ends of the collars being provided with flanges 18, which are rolled over like eyelets so as to have a bearing on the outer faces of the box. To turn the spool I provide a wire handle formed from a single piece of wire doubled at the center to form two spring-arms 19 and 20, the ends 21 and 22 of which are inwardly offsetting and the points 23 and 24 are turned outward and adapted to enter the sockets 13 and 14 in the spool, the offset ends being proportioned so that the handle may stand in a plane parallel with the face of the box, as shown in Fig. 2 of the drawings, or be somewhat lifted away from the box to facilitate the turning of the spool to wind the strip material thereon, the inner end of the strip being preferably inserted in the notch 11 in the spool. It will be noted that the collars 16 and 17 do not meet at the center, so that they do not obstruct the sockets 13 and 14.

I claim:

1. A reel for strip material comprising a box, a spool mounted therein and connected thereto on opposite sides by metal collars, said spool formed with a central opening and with sockets on opposite sides of the opening, combined with a wire handle having inwardly-offsetting ends and outwardly-extending tips adapted to enter said sockets.

2. A reel for strip material comprising a box, a spool mounted therein and formed with a central opening and with sockets on opposite sides of said opening, flanged collars entering the opposite sides of the spool through opposite sides of the box, said collars formed with flanges turned over against the faces of the box, and a wire handle formed with inwardly-offsetting ends adapted to enter the opening in the said spool and formed with outwardly extending tips adapted to enter the sockets in the spool.

In testimony whereof, I have signed this specification in the presence of two subscribing witnesses.

EDWIN B. GAGER, JR.

Witnesses:
 EDWIN B. GAGER,
 ELNA C. MOLLERUP.